(12) United States Patent
Liu

(10) Patent No.: US 11,582,777 B2
(45) Date of Patent: *Feb. 14, 2023

(54) DATA TRANSMISSION METHOD AND DEVICE, AND COMPUTER STORAGE MEDIUM

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 149 days.

This patent is subject to a terminal disclaimer.

(21) Appl. No.: 17/069,363

(22) Filed: Oct. 13, 2020

(65) Prior Publication Data
US 2021/0029728 A1 Jan. 28, 2021

Related U.S. Application Data

(63) Continuation of application No. 16/940,839, filed on Jul. 28, 2020, now Pat. No. 10,856,312, which is a
(Continued)

(51) Int. Cl.
*H04W 72/12* (2009.01)
*H04W 72/1263* (2023.01)
(Continued)

(52) U.S. Cl.
CPC ......... *H04W 72/1263* (2013.01); *H04W 4/40* (2018.02); *H04W 72/1215* (2013.01);
(Continued)

(58) Field of Classification Search
CPC ... H04W 4/40; H04W 72/1263; H04W 76/25; H04W 72/1215; H04W 72/1242; H04W 72/1257
(Continued)

(56) References Cited

U.S. PATENT DOCUMENTS

2003/0016770 A1  1/2003  Trans et al.
2017/0245316 A1  8/2017  Salkintzis
(Continued)

FOREIGN PATENT DOCUMENTS

CA    3007513 A1   8/2017
CN   106465128 A   2/2017
(Continued)

OTHER PUBLICATIONS

Huawei et al: "Discussion on Reliability for Rel-15 EPS based eV2X", 3GPP Draft; S2-180149 Discussion on the Reply to the LS on Reliability for V2X Final, 3rd Generation Partnership Project (3GPP), Mobile Competence Centre; 650, Route Des Lucioles; F-06921 Sophia-Ant vol. SA WG2, No. Gothenburg, Sweden; Jan. 22, 2018 Jan. 26, 2018, Jan. 16, 2018 (Jan. 16, 2018), XP051389599, [retrieved on Jan. 16, 2018]* the whole document *.
(Continued)

*Primary Examiner* — Leila Malek
(74) *Attorney, Agent, or Firm* — Perkins Coie LLP

(57) ABSTRACT

A data transmission method and device are provided. The method comprises a non-access stratum of a terminal device obtains description information of data to be transmitted; the non-access stratum determines, according to a mapping relationship between preset data description information and reliability transmission indication information, and the description information of the data to be transmitted, the reliability transmission indication information corresponding to the data to be transmitted, the reliability transmission
(Continued)

indication information being used for indicating whether to perform reliability transmission on the data to be transmitted; transmitting, by the NAS, the reliable transmission indication information corresponding to the data to be transmitted to an access stratum of the terminal device, and performing, by the terminal device, transmission of the data to be transmitted.

22 Claims, 4 Drawing Sheets

Related U.S. Application Data continuation of application No. PCT/CN2018/076868, filed on Feb. 14, 2018.

(51) Int. Cl.
  *H04W 76/25* (2018.01)
  *H04W 4/40* (2018.01)
  *H04W 92/18* (2009.01)

(52) U.S. Cl.
  CPC ... *H04W 72/1242* (2013.01); *H04W 72/1257* (2013.01); *H04W 76/25* (2018.02); *H04W 92/18* (2013.01)

(58) Field of Classification Search
  USPC .......................................................... 375/259
  See application file for complete search history.

(56) References Cited

U.S. PATENT DOCUMENTS

| | | | |
|---|---|---|---|
| 2018/0249530 A1 | 8/2018 | Salkintzis | |
| 2019/0342937 A1 | 11/2019 | Salkintzis | |

FOREIGN PATENT DOCUMENTS

| | | | | |
|---|---|---|---|---|
| CN | 107241164 A | 10/2017 | | |
| RU | 2568295 C2 | 11/2015 | | |
| WO | 2014047933 A1 | 4/2014 | | |
| WO | 2017172789 A1 | 10/2017 | | |
| WO | WO-2018022225 A1 * | 2/2018 | ............... | G08G 1/22 |
| WO | WO-2018117775 A1 * | 6/2018 | ............ | H04W 12/06 |

OTHER PUBLICATIONS

Intel Corporation: "Design aspects affecting reliability of URLLC services", 3GPP Draft; R1-1702243 INTEL-URLLC_Reliability, 3rd Generation Partnership Project (3GPP), Mobile Competence Centre 650, Route Des Lucioles; F-06921 Sophia-Antipolis Cedex; France, vol. RAN WG1, No. Athens, Greece; Feb. 13, 2017-Feb. 17, 2017, Feb. 12, 2017 (Feb. 12, 2017), XP051209401, Retrieved from the Internet: URL: http://www.3gpp.org/ftp/Meetings_3GPP_SYNC/RAN1/Docs/[ retrieved on Feb. 12, 2017]* Section 2 *.
Supplementary European Search Report in the European application No. 18906240.9, dated Nov. 27, 2020.
Notice of Allowance of the U.S. Appl. No. 16/940,839, dated Sep. 2, 2020.
First Office Action of the Canadian application No. 3090434, dated Aug. 24, 2021. 4 pages.
"3rd Generation Partnership Project; Technical Specification Group Services and System Aspects; Architecture enhancements for V2X services (Release 14)", 3GPP TS 23.285 V14.5.0 (Dec. 2017), http://www.3gpp.org.
"3rd Generation Partnership Project; Technical Specification Group Services and System Aspects; System Architecture for the 5G System; Stage 2 (Release 15)", 3GPP TS 23.501 V15.0.0 (Dec. 2017), http://www.3gpp.org.
English translation of the Written Opinion of the International Search Authority in the international application No. PCT/CN2018/076868, dated Jul. 11, 2018.
Huawei. "Email Discussion Summary on Control of UL PDCP Duplication", 3GPP TSG-RAN2#98 R2-1704834, May 19, 2017 (May 19, 2017), chapter 2, paragraph 1 to last paragraph.
Huawei. "Dynamic Activation/Deactivation of Packet Duplication", 3GPP TSG-RAN2 #98 R2-1704835, May 19, 2017 (May 19, 2017), chapter 2, paragraph 1 to last paragraph.
ZTE. "Consideration on the Activation/Deactivation of Data Duplication for CA", 3GPP TSG-RAN WG2 Meeting #98 R2-1704660, May 19, 2017 (May 19, 2017), chapter 2, paragraph 1 to last paragraph.
International Search Report in the international application No. PCT/CN2018/076868, dated Jul. 11, 2018.
Notice of Allowance of the Russian application No. 2020127096, dated May 20, 2021.
Office Action of the Indian application No. 202017036486, dated Apr. 30, 2021.
First Office Action of the European application No. 18906240.9, dated May 13, 2022. 5 pages.
First Written Opinion of the Singaporean application No. 11202007452T, dated Jun. 28, 2022. 9 pages.
Second Office Action of the Canadian application No. 3090434, dated Jun. 10, 2022. 4 pages.
First Office Action of the Chinese application No. 202010451639.7, dated Nov. 2, 2022. 18 pages with English translation.

* cited by examiner

DATA TRANSMISSION METHOD AND DEVICE, AND COMPUTER STORAGE MEDIUM

CROSS-REFERENCE TO RELATED APPLICATIONS

This application is a continuation of U.S. application Ser. No. 16/940,839, filed on Jul. 28, 2020, which is a continuation application of International Patent Application No. PCT/CN2018/076868, filed on Feb. 14, 2018. The entire contents of the above applications are incorporated herein by reference in their entirety.

BACKGROUND

A Sidelink (SL) transmission technology based on Long Term Evolution (LTE) Device to Device (D2D) is adopted for a Vehicle-to-Everything (V2X) system. Unlike a conventional LTE system adopting a manner of receiving or sending communication data through a base station, a V2X system adopts a D2D communication manner and thus is higher in spectrum efficiency and lower in transmission delay.

In the 3rd Generation Partnership Project (3GPP) Release 14 (Rel-14), a V2X technology is standardized, and two transmission modes are defined: a mode 3 and a mode 4. In the mode 3, a transmission resource of a terminal is allocated by a base station. In the mode 4, the terminal determines the transmission resource in a manner combining sensing and reservation.

For a Carrier Aggregation (CA) technology, a solution supporting data duplication transmission implements respective transmission of a duplicated Packet Data Convergence Protocol (PDCP) Protocol Data Unit (PDU) to two Radio Link Control (RLC) entities (two different logical channels) by use of a data duplication function (as illustrated in FIG. 1) of a PDCP and finally ensures that the duplicated PDCP PDU may be transmitted on different physical-layer aggregated carriers, thereby achieving a frequency diversity gain to improve data transmission reliability. Therefore, performing data transmission through a network architecture illustrated in FIG. 1 may improve transmission reliability of data to be transmitted.

However, how to determine whether to perform reliable transmission or not based on a V2X transmission mode and the architecture illustrated in FIG. 1 in a data transmission process of data to be transmitted is a problem that needs to be solved.

SUMMARY

Embodiments of the disclosure relate to the technical field of wireless communication, and particularly, to a method and device of data transmission and a computer storage medium.

The technical solutions of the embodiments of the disclosure may be implemented as follows.

According to a first aspect, the embodiments of the disclosure provide a method of data transmission, which may include the following operations.

A Non-Access Stratum (NAS) of a terminal device acquires description information of data to be transmitted.

The NAS determines reliable transmission indication information corresponding to the data to be transmitted according to a preset mapping relationship between data description information and reliable transmission indication information and the description information of the data to be transmitted, the reliable transmission indication information being used to indicate whether to perform reliable transmission on the data to be transmitted.

Responsive to the reliable transmission indication information indicating reliable transmission to be performed on the data to be transmitted, after the NAS transmits the reliable transmission indication information corresponding to the data to be transmitted to an access stratum of the terminal device, the access stratum sends a reliable transmission request message to a network device, the reliable transmission request message being configured for transmission of the data to be transmitted between the terminal device and the network device through a set reliable transmission policy.

According to a second aspect, the embodiments of the disclosure provide a method of data transmission, which may be applied to a network device and include the following operations.

A reliable transmission request message sent by an access stratum of a terminal device is received.

Data to be transmitted is transmitted based on the reliable transmission request message through a set reliable transmission policy.

According to a third aspect, the embodiments of the disclosure provide a terminal device, which may include an acquisition part, determination part and transmission part in a NAS and a sending part in an access stratum.

The acquisition part may be configured to acquire description information of data to be transmitted.

The determination part may be configured to determine reliable transmission indication information corresponding to the data to be transmitted according to a preset mapping relationship between data description information and reliable transmission indication information and the description information of the data to be transmitted, the reliable transmission indication information being used to indicate whether to perform reliable transmission on the data to be transmitted.

The transmission part may be configured to transmit the reliable transmission indication information corresponding to the data to be transmitted to the access stratum of the terminal device responsive to the reliable transmission indication information indicating reliable transmission to be performed on the data to be transmitted.

The sending part may be configured to send a reliable transmission request message to a network device, the reliable transmission request message being configured for transmission of the data to be transmitted between the terminal device and the network device through a set reliable transmission policy.

According to a fourth aspect, the embodiments of the disclosure provide a network device, which may include a receiving part and a data transmission part.

The receiving part may be configured to receive a reliable transmission request message sent by an access stratum of a terminal device.

The data transmission part may be configured to transmit data to be transmitted based on the reliable transmission request message through a set reliable transmission policy.

According to a fifth aspect, the embodiments of the disclosure provide a terminal device, which may include a first network interface, a first memory and a first processor.

The first network interface may be configured to receive and send a signal in a process of receiving and sending information with another external network element.

The first memory may be configured to store a computer program which is executable in the first processor.

The first processor may be configured to execute the computer program to execute the steps of the method of the first aspect.

According to a sixth aspect, the embodiments of the disclosure provide a network device, which may include a second network interface, a second memory and a second processor.

The second network interface may be configured to receive and send a signal in a process of receiving and sending information with another external network element.

The second memory may be configured to store a computer program which is executable in the second processor.

The second processor may be configured to execute the computer program to execute the steps of the method of the second aspect.

According to a seventh aspect, the embodiments of the disclosure provide a computer storage medium, which may store a data transmission program, the data transmission program being executed by at least one processor to implement the steps of the method of the first aspect or the second aspect.

DETAILED DESCRIPTION

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

It is to be understood that the technical solutions of the embodiments of the application may be applied to a V2X system, and the V2X system may be based on various communication systems, for example, an LTE-D2D-based V2X system. Unlike a manner of receiving or sending communication data between terminals in a conventional LTE system through a network device (for example, a base station), the V2X system adopts a D2D communication manner and thus is higher in spectral efficiency and lower in transmission delay. V2X transmission modes, i.e., a mode 3 and a mode 4, disclosed in Rel-14 will be briefly described as follows.

Figure 1:
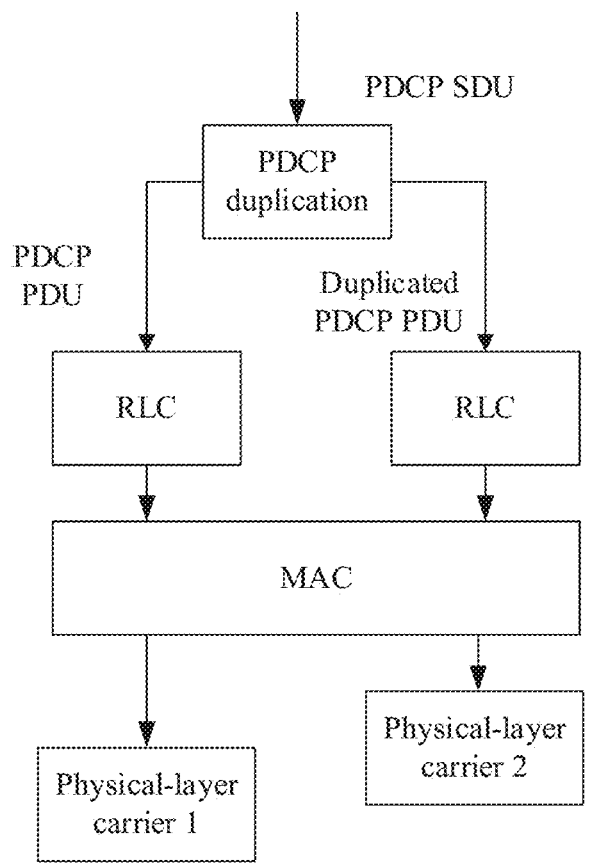
FIG. 1 is a structure diagram of a dual connectivity network.
Figure 2:
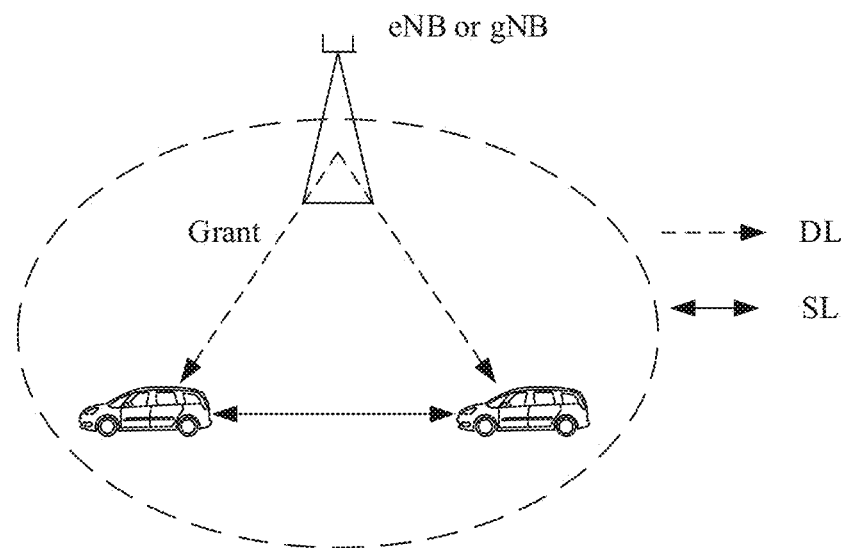
FIG. 2 is a schematic diagram of a scenario of a mode 3 in V2X.

In the mode 3, as illustrated in FIG. 2, a transmission resource of a vehicle terminal is allocated by a base station, for example, allocated by an Evolved NodeB (eNB or eNodeB) in LTE or a 5th-Generation (5G) base station (gNB) in New Radio (NR). Specifically, the base station transmits a control message configured to indicate a grant resource to the vehicle terminal through a Down Link (DL), and then the vehicle terminal sends data in an SL according to the resource allocated by the base station. In the mode 3, the base station may allocate a resource for single transmission to the vehicle terminal and may also allocate a resource for semi-persistent transmission to the terminal.

Figure 3:
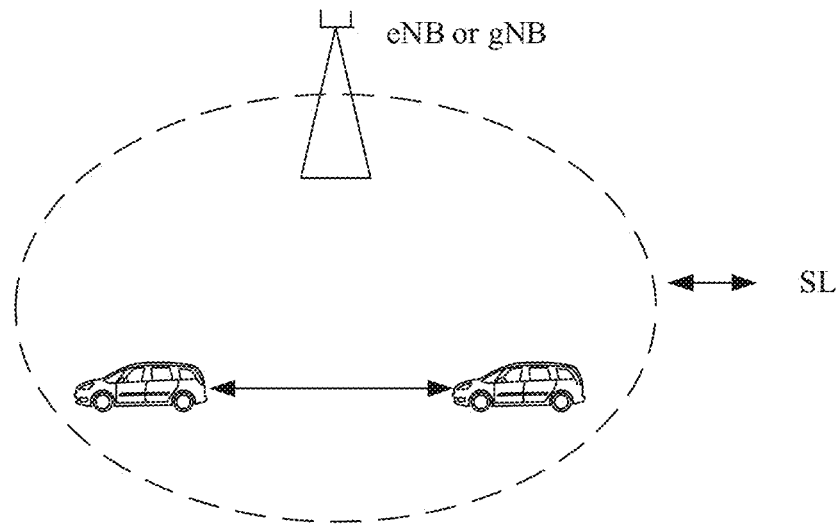
FIG. 3 is a schematic diagram of a scenario of a mode 4 in V2X.

In the mode 4, as illustrated in FIG. 3, the vehicle terminal adopts a transmission manner combining sensing and reservation. The vehicle terminal acquires an available transmission resource set in a resource pool in a sensing manner, and the vehicle terminal randomly selects a resource from the transmission resource set for data transmission. Since a service in a V2X system is periodic, the vehicle terminal usually adopts a semi-persistent transmission manner, namely the vehicle terminal, after selecting a transmission resource, may keep using the resource in multiple transmission cycles, so that probabilities of resource reselection and resource conflict are reduced. The vehicle terminal may contain information of reserving a resource for next transmission in control information transmitted this time such that another terminal may detect the control information of the vehicle terminal to judge whether the resource is reserved for the vehicle terminal to use or not to achieve the purpose of reducing resource conflicts.

Optionally, a communication system that the V2X system is based on may be a Global System of Mobile communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system, an NR or 5G system and the like.

A terminal device in the embodiments of the application may refer to a vehicle terminal device, and may also be a terminal device in a 5G network, a terminal device in a future evolved Public Land Mobile Network (PLMN) or the like. There are no limits made in the embodiments of the application.

Each embodiment of the application is described in combination with a network device. In the embodiments of the application, a network device may be a device configured to communicate with the terminal device. The network device may be a Base Transceiver Station (BTS) in the GSM or the CDMA, may also be a NodeB (NB) in the WCDMA system, may also be an eNB in the LTE system and may further be a wireless controller in a Cloud Radio Access Network (CRAN) scenario. Or the network device may be a relay station, an access point, a vehicle device, a wearable device, a network device in the future 5G network, a network device in the future evolved PLMN or the like. There are no limits made in the embodiments of the application.

Based on the exemplary descriptions of the two modes, the embodiments of the disclosure will be elaborated and described through the following embodiments.

It can be understood that all the technical solutions of the embodiments of the application are not only applied to a V2X system but also applied to other D2D communication systems. The terminal in the embodiments of the disclosure may be a vehicle terminal, a handheld terminal, a Personal Digital Assistant (PDA), a wearable terminal and the like. The network in the embodiments of the disclosure may be an NR network, an LTE network and the like.

Embodiment 1

Figure 4:
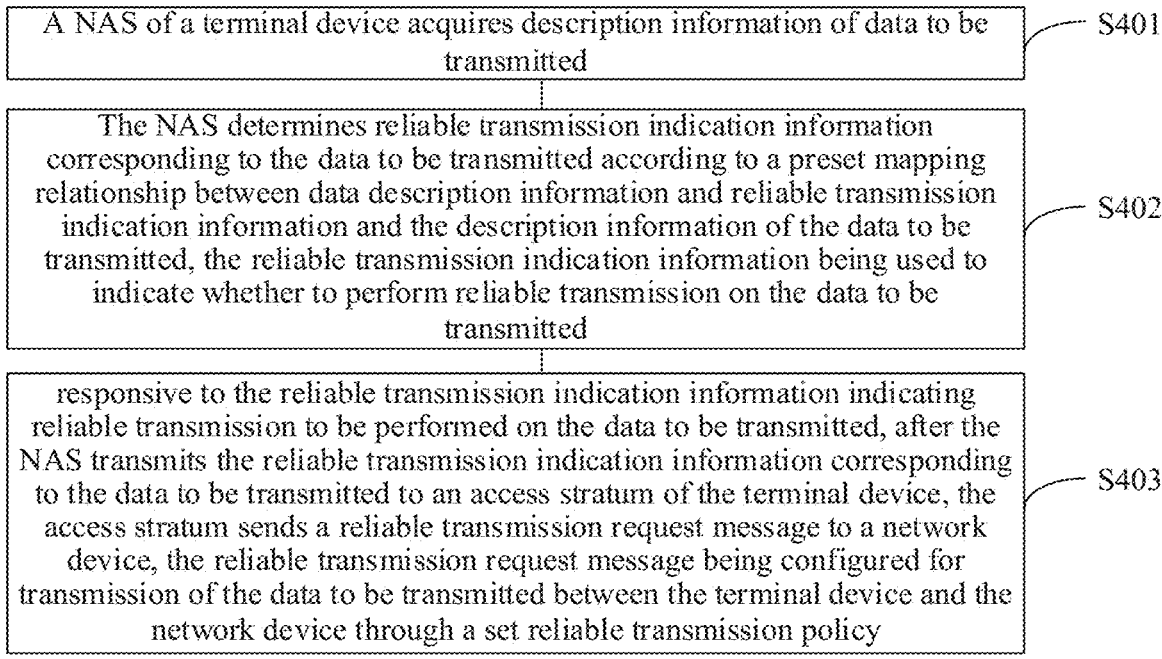
FIG. 4 is a flowchart of a method of data transmission according to an embodiment of the disclosure.

Referring to FIG. 4, a method of data transmission provided in the embodiment of the disclosure is illustrated. The method may include the following operations.

In S401, a NAS of a terminal device acquires description information of data to be transmitted.

In S402, the NAS determines reliable transmission indication information corresponding to the data to be transmitted according to a preset mapping relationship between data description information and reliable transmission indication information and the description information of the data to be transmitted. The reliable transmission indication information is used to indicate whether to perform reliable transmission on the data to be transmitted.

In S403, responsive to the reliable transmission indication information indicating reliable transmission to be performed on the data to be transmitted, after the NAS transmits the reliable transmission indication information corresponding to the data to be transmitted to an access stratum of the terminal device, the access stratum sends a reliable transmission request message to a network device. The reliable transmission request message is configured for transmission of the data to be transmitted between the terminal device and the network device through a set reliable transmission policy.

It is to be noted that, in a communication protocol stack, the NAS usually refers to a function layer supporting message transmission only between a terminal and a core network device. A specific message type is, for example, a service creation, release or mobility management type. Thus it can be seen that a protocol entity in the NAS may provide functions of mobility management, session management, service management and the like. The access stratum usually refers to a function layer for message transmission between the terminal and an access device. The access device may include a network entity such as a base station and a Radio Network Controller (RNC) in a radio access network. The access stratum may usually include a Radio Resource Control (RRC) layer and a PDCP.

Based on the above-described contents, for example, for reliable transmission through PDCP duplication, in the technical solution illustrated in FIG. 4, since service management is implemented through the NAS while PDCP duplication transmission is implemented through the access stratum, when the access stratum of the terminal implements reliable transmission, it is necessary to determine whether to perform reliable transmission on the data to be transmitted for a service corresponding to the data to be transmitted through the NAS and instruct the access stratum and the network device to perform reliable transmission for the data to be transmitted. Based on an instruction of the NAS, the access stratum of the terminal may learn whether to perform reliable transmission on the data to be transmitted.

For the technical solution illustrated in FIG. 4, under a normal condition, for a specific application and service, whether reliable transmission is required to be performed on data to be transmitted or not is usually related to the service and application to which the data to be transmitted belongs and is also related to transmission importance of the data to be transmitted. In the embodiment, the description information of the data to be transmitted is preferably configured to describe characteristic information related to a service or application corresponding to the data to be transmitted or importance characteristic information of the data to be transmitted. Therefore, the description information of the data to be transmitted may specifically include any one of:

an identifier of a service or application to which the data to be transmitted belongs;

or, a type of a service or application to which the data to be transmitted belongs;

or, self-driving degree information corresponding to a service or application to which the data to be transmitted belongs;

or, a data type of the data to be transmitted;

or, a priority of the data to be transmitted.

Based on the description information of the data to be transmitted, the preset mapping relationship between the data description information and the reliable transmission indication information further includes:

a preset mapping relationship between: identifiers of services or applications to which data belongs, and reliable transmission indication information;

or, a preset mapping relationship between: types of services or applications to which the data belongs, and reliable transmission indication information;

or, a preset mapping relationship between: self-driving degree information corresponding to services or applications to which the data belongs, and reliable transmission indication information;

or, a preset mapping relationship between data types and reliable transmission indication information;

or, a preset mapping relationship between data priorities and reliable transmission indication information.

It is to be noted that, in the embodiment, the preset mapping relationship between the data description information and the reliable transmission indication information may specifically be a mapping relationship, set by the NAS of the terminal device based on pre-configuration or a content defined in an existing communication protocol, between the data description information and the reliable transmission indication information.

For example, reliable transmission is applied to the specific service or application, or, reliable transmission is not applied to the specific service or application, In such case, the NAS may determine whether reliable transmission required to be performed for the data to be transmitted or not according to the application identifier or service identifier corresponding to the data to be transmitted.

Besides, reliable transmission is applied to a specific application or service type, or, reliable transmission is not applied to the specific service or application type. In such case, the NAS may determine whether reliable transmission is required to be performed on the data to be transmitted or not according to the type of the service or application to which the data to be transmitted belongs. Generally speaking, in a V2X technology, the service type or the application type may include vehicles platooning, advanced driving, extended sensors, remote driving and the like. The service or application types may be divided into two parts that reliable transmission is applied to and reliable transmission is not applied to respectively. For data to be transmitted corresponding to the service type or application type of the part that reliable transmission is applied to, the NAS may determine to perform reliable transmission on the data to be transmitted. For data to be transmitted corresponding to the service type or application type of the part that reliable transmission is not applied to, the NAS may determine not to perform reliable transmission on the data to be transmitted.

In addition, for an application and service related to self-driving in V2X, whether to perform reliable transmission on the data to be transmitted may also be determined according to the self-driving degree information corresponding to the service or application to which the data to be transmitted belongs. In the embodiment, self-driving degrees may be divided into three grades, i.e., low-degree self-driving, medium-degree self-driving and high-degree self-driving respectively. Thus it can be seen that, if the grade is higher, the self-driving degree is higher, an intervention degree of manual control of a driver is correspondingly lower and a corresponding requirement on reliability of the data is higher. Therefore, reliable transmission may be performed for the data to be transmitted of a part involving high-degree self-driving in the service or the application.

Moreover, for a data type transmitted in V2X, reliable transmission may also be pertinently performed. In such case, the NAS may determine whether reliable transmission is required to be performed for the data to be transmitted or not according to the data type of the data to be transmitted. In the V2X technology, a data type of data to be transmitted may include Internet Protocol (IP) data, non-IP data, Ethernet data, unstructured data and the like. Different data types have different reliable transmission requirements, for example, the IP data requires reliable transmission while the non-IP data or the Ethernet data does not require reliable transmission. Therefore, for data to be transmitted of which a data type is IP data, the NAS may determine to perform reliable transmission on the data to be transmitted; and for data to be transmitted of which a data type is non-IP data or Ethernet data, the NAS may determine not to perform reliable transmission on the data to be transmitted.

Furthermore, the priority of the data to be transmitted may also be taken as a reference for determining whether to perform reliable transmission or not. Grading is performed for priorities. Like the self-driving degrees, if the priority is higher, reliable transmission is required more. Elaborations are omitted herein.

It is to be noted that, after the above exemplary description information of the data to be transmitted, the description information of the data to be transmitted may be matched with the preset mapping relationship between the data description information and the reliable transmission indication information, thereby determining whether reliable transmission is required to be performed on the data to be transmitted or not and correspondingly generating the reliable transmission indication information, provided for the access stratum, for the data to be transmitted. Based on this, the operation that the NAS determines the reliable transmission indication information corresponding to the data to be transmitted according to the preset mapping relationship between the data description information and the reliable transmission indication information and the description information of the data to be transmitted includes the following operations.

In case of the preset mapping relationship between the identifiers of services or applications to which data belongs and the reliable transmission indication information, when the identifier of the service or application to which the data to be transmitted belongs is matched with the mapping relationship, it is determined that the reliable transmission indication information corresponding to the data to be transmitted indicates reliable transmission to be performed on the data to be transmitted.

Or, in case of the preset mapping relationship between the types of the services or applications to which the data belongs and the reliable transmission indication information, when the type of the service or application to which the data to be transmitted belongs is matched with the mapping relationship, it is determined that the reliable transmission indication information corresponding to the data to be transmitted indicates reliable transmission to be performed on the data to be transmitted.

Or, in case of the preset mapping relationship between the self-driving degree information corresponding to the services or applications to which the data belongs and the reliable transmission indication information, when the self-driving degree information corresponding to the service or application to which the data to be transmitted belongs is matched with the mapping relationship, it is determined that the reliable transmission indication information corresponding to the data to be transmitted indicates reliable transmission to be performed on the data to be transmitted.

Or, in case of the preset mapping relationship between the data types and the reliable transmission indication information, when the data type of the data to be transmitted is matched with the mapping relationship, it is determined that the reliable transmission indication information corresponding to the data to be transmitted indicates reliable transmission to be performed on the data to be transmitted.

Or, in case of the preset mapping relationship between the data priorities and the reliable transmission indication information, when the priority of the data to be transmitted is matched with the mapping relationship, it is determined that the reliable transmission indication information corresponding to the data to be transmitted indicates reliable transmission to be performed on the data to be transmitted.

For the technical solution illustrated in FIG. 4, a CA technology may support a PDCP duplication function. In such case, after the operation that the access stratum sends the reliable transmission request message to the network device, the method may further include the following operation.

The data to be transmitted is sent to the network device based on a set CA policy.

For the technical solution illustrated in FIG. 4, reliable transmission for the data to be transmitted is elaborated through the above contents. In a possible implementation mode, the method may further include that: responsive to the reliable transmission indication information indicating reliable transmission not to be performed on the data to be transmitted, which indicates that the reliable transmission request message is not required to be sent to the network device, the NAS does not transmit the data to be transmitted through the reliable transmission policy.

According to the method of data transmission provided in the embodiment, the NAS of the terminal provides an instruction of performing reliable transmission for the access stratum according to the related description information of the data to be transmitted, and then the access stratum may request the network device for reliable transmission according to the instruction, so that the access stratum of the terminal may learn whether to perform reliable transmission on the data to be transmitted.

Embodiment 2

Figure 5:
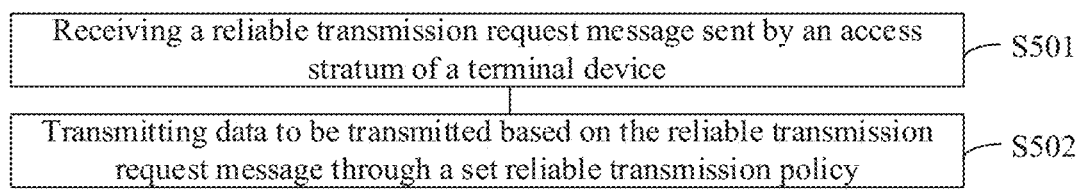
FIG. 5 is a flowchart of another method of data transmission according to an embodiment of the disclosure.

Based on the same inventive concept of the abovementioned embodiment, referring to FIG. 5, a method of data transmission provided in the embodiment of the disclosure is illustrated. The method is applied to a network device. The method includes the following steps.

In S501, a reliable transmission request message sent by an access stratum of a terminal device is received.

In S502, data to be transmitted is transmitted based on the reliable transmission request message through a set reliable transmission policy.

It is to be noted that the reliable transmission request message includes data information to be transmitted that reliable transmission is required to be performed on, so that the network device may transmit the data to be transmitted through the set reliable transmission policy according to the request message. Specifically, transmission through a PDCP duplication function supported by a CA technology may be a preferred reliable transmission manner. Elaborations thereof are omitted in the embodiment.

Embodiment 3

Figure 6:
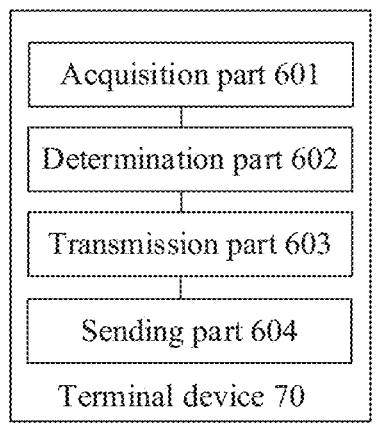
FIG. 6 is a diagram of the structure of a terminal device according to an embodiment of the disclosure.

Based on the same inventive concept of the abovementioned embodiments, referring to FIG. 6, a terminal device 60 provided in the embodiment of the disclosure is shown, and includes an acquisition part 601, determination part 602 and transmission part 603 in a NAS and a sending part 604 in an access stratum.

The acquisition part 601 is configured to acquire description information of data to be transmitted.

The determination part 602 is configured to determine reliable transmission indication information corresponding to the data to be transmitted according to a preset mapping relationship between data description information and reliable transmission indication information and the description information of the data to be transmitted, the reliable transmission indication information being used to indicate whether to perform reliable transmission on the data to be transmitted.

The transmission part 603 is configured to transmit the reliable transmission indication information corresponding to the data to be transmitted to the access stratum of the terminal device 60 responsive to the reliable transmission indication information indicating reliable transmission to be performed on the data to be transmitted.

The sending part 604 is configured to send a reliable transmission request message to a network device, the reliable transmission request message being configured for transmission of the data to be transmitted between the terminal device 60 and the network device through a set reliable transmission policy.

In the solution, the description information, acquired by the acquisition part 601, of the data to be transmitted includes:

an identifier of a service or application to which the data to be transmitted belongs;

or, a type of a service or application to which the data to be transmitted belongs;

or, self-driving degree information corresponding to a service or application to which the data to be transmitted belongs;

or, a data type of the data to be transmitted;

or, a priority of the data to be transmitted.

In the solution, the preset mapping relationship between the data description information and the reliable transmission indication information includes:

a preset mapping relationship between: identifiers of services or applications to which data belongs, and reliable transmission indication information;

or, a preset mapping relationship between: types of services or applications to which the data belongs, and reliable transmission indication information;

or, a preset mapping relationship between: self-driving degree information corresponding to services or applications to which the data belongs, and reliable transmission indication information;

or, a preset mapping relationship between data types and reliable transmission indication information;

or, a preset mapping relationship between data priorities and reliable transmission indication information.

In the solution, the determination part 602 is configured to:

in case of the preset mapping relationship between the identifiers of services or applications to which data belongs and the reliable transmission indication information, when the identifier of the service or application to which the data to be transmitted belongs is matched with the mapping relationship, determine that the reliable transmission indication information corresponding to the data to be transmitted indicates reliable transmission to be performed on the data to be transmitted;

or, in case of the preset mapping relationship between the types of the services or applications to which the data belongs and the reliable transmission indication information, when the type of the service or application to which the data to be transmitted belongs is matched with the mapping relationship, determine that the reliable transmission indication information corresponding to the data to be transmitted indicates reliable transmission to be performed on the data to be transmitted;

or, in case of the preset mapping relationship between the self-driving degree information corresponding to the services or applications to which the data belongs and the reliable transmission indication information, when the self-driving degree information corresponding to the service or application to which the data to be transmitted belongs is matched with the mapping relationship, determine that the reliable transmission indication information corresponding to the data to be transmitted indicates reliable transmission to be performed on the data to be transmitted;

or, in case of the preset mapping relationship between the data types and the reliable transmission indication information, when the data type of the data to be transmitted is matched with the mapping relationship, determine that the reliable transmission indication information corresponding to the data to be transmitted indicates reliable transmission to be performed on the data to be transmitted;

or, in case of the preset mapping relationship between the data priorities and the reliable transmission indication information, when the priority of the data to be transmitted is matched with the mapping relationship, determine that the reliable transmission indication information corresponding to the data to be transmitted indicates reliable transmission to be performed on the data to be transmitted.

Figure 7:
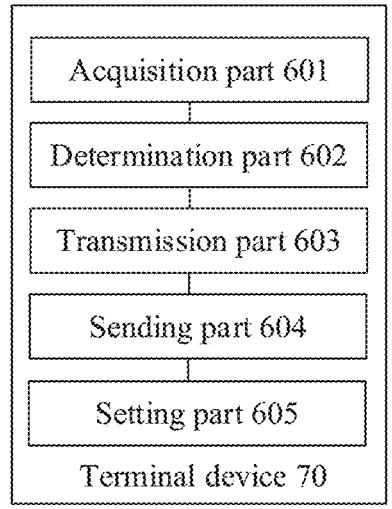
FIG. 7 is a diagram of the structure of another terminal device according to an embodiment of the disclosure.

In the solution, referring to FIG. 7, the terminal device 60 further includes a setting part 605 in the NAS, configured to set the mapping relationship between the data description information and the reliable transmission indication information based on pre-configuration or a content defined in an existing communication protocol.

In the solution, the sending part 604 is further configured to send the data to be transmitted to the network device based on a set CA policy.

In the solution, the transmission part 603 is further configured to, responsive to the reliable transmission indication information indicating reliable transmission not to be performed on the data to be transmitted, not transmit the data to be transmitted through the reliable transmission policy.

It can be understood that the terminal device 60 involved in the embodiment is a terminal device in a D2D network architecture and may even be a terminal device in a V2X network architecture.

It can be understood that, in the embodiment, "part" may be part of a circuit, part of a processor, part of a program or software and the like, of course, may also be a unit, and may also be modular and non-modular.

In addition, each component in the embodiment may be integrated into a processing unit, each unit may also exist independently, and two or more than two units may also be integrated into a unit. The integrated unit may be implemented in a hardware form and may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or part of the steps of the method in the embodiment. The storage medium includes: various media capable of storing program codes such as a U disk, a mobile hard disk, a Read Only Memory (ROM), a Random Access Memory (RAM), a magnetic disk or an optical disk.

Therefore, the embodiment provides a computer storage medium, which stores a data transmission program, the data transmission program being executed by at least one processor to implement the steps of the method in embodiment 1.

Figure 8:
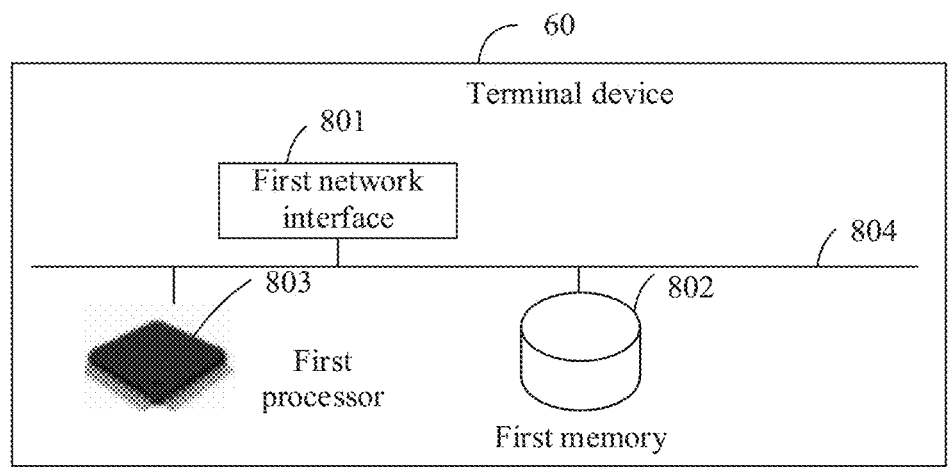
FIG. 8 is a specific hardware structure diagram of a terminal device according to an embodiment of the disclosure.

Based on the terminal device 60 and the computer storage medium, referring to FIG. 8, a specific hardware structure of the terminal device 60 provided in the embodiment of the disclosure is shown, and includes a first network interface 801, a first memory 802 and a first processor 803. Each component is coupled together through a bus system 804. It can be understood that the bus system 804 is configured to implement connection communication between these components. The bus system 804 includes a data bus and further includes a power bus, a control bus and a state signal bus. However, for clear description, various buses in FIG. 8 are marked as the bus system 804. The first network interface 801 is configured to receive and send a signal in a process of receiving and sending information with another external network element.

The first memory 802 is configured to store a computer program which is executable in the first processor 803.

The first processor 803 is configured to execute the computer program to execute the following operations.

A NAS acquires description information of data to be transmitted.

The NAS determines reliable transmission indication information corresponding to the data to be transmitted according to a preset mapping relationship between data description information and reliable transmission indication information and the description information of the data to be transmitted, the reliable transmission indication information being used to indicate whether to perform reliable transmission on the data to be transmitted.

Responsive to the reliable transmission indication information indicating reliable transmission to be performed on the data to be transmitted, after the NAS transmits the reliable transmission indication information corresponding to the data to be transmitted to an access stratum of the terminal device, the access stratum sends a reliable transmission request message to a network device, the reliable transmission request message being configured for transmission of the data to be transmitted between the terminal device and the network device through a set reliable transmission policy.

It can be understood that the first memory 802 in the embodiment of the disclosure may be a volatile memory or a nonvolatile memory, or may include both the volatile and nonvolatile memories. The nonvolatile memory may be a ROM, a Programmable ROM (PROM), an Erasable PROM (EPROM), an Electrically EPROM (EEPROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). It is to be noted that the first memory 802 of a system and method described in the disclosure is intended to include, but not limited to, memories of these and any other proper types.

The first processor 803 may be an integrated circuit chip with a signal processing capability. In an implementation process, each step of the method may be completed by an integrated logic circuit of hardware in the first processor 803 or an instruction in a software form. The first processor 803 may be a universal processor, a Digital Signal Processor (DSP), an Application Specific Integrated Circuit (ASIC), a Field Programmable Gate Array (FPGA) or another Programmable Logic Device (PLD), discrete gate or transistor logical device and discrete hardware component. Each method, step and logical block diagram disclosed in the embodiment of the disclosure may be implemented or executed. The universal processor may be a microprocessor or the processor may also be any conventional processor and the like. The steps of the method disclosed in combination with the embodiment of the disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM and a register. The storage medium is located in the first memory 802. The first processor 803 reads information in the first memory 802 and completes the steps of the method in combination with hardware.

It can be understood that these embodiments described in the disclosure may be implemented by hardware, software, firmware, middleware, a microcode or a combination thereof. In case of implementation with the hardware, the processing unit may be implemented in one or more ASICs, DSPs, DSP Devices (DSPDs), PLDs, FPGAs, universal processors, controllers, microcontrollers, microprocessors, other electronic units configured to execute the functions in the application or combinations thereof.

In case of implementation with the software, the technology of the disclosure may be implemented through the modules (for example, processes and functions) executing the functions in the disclosure. A software code may be stored in the memory and executed by the processor. The memory may be implemented in the processor or outside the processor.

Specifically, the first processor 803 in the terminal device 60 is further configured to execute the computer program to execute the steps of the method in embodiment 1. Elaborations are omitted herein.

Embodiment 4

Figure 9:
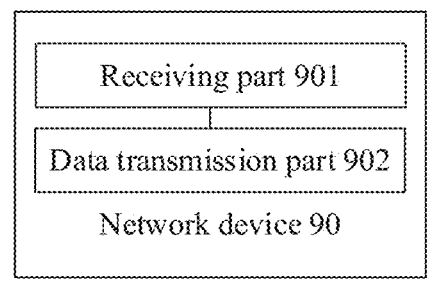
FIG. 9 is a diagram of the structure of a network device according to an embodiment of the disclosure.

Based on the same inventive concept of the abovementioned embodiments, referring to FIG. 9, a network device 90 provided in the embodiment of the disclosure is illustrated. The network device 90 includes a receiving part 901 and a data transmission part 902.

The receiving part 901 is configured to receive a reliable transmission request message sent by an access stratum of a terminal device.

The data transmission part 902 is configured to transmit data to be transmitted based on the reliable transmission request message through a set reliable transmission policy.

It can be understood that the network device 90 involved in the embodiment is a network device in a D2D network architecture and may even be a network device in a V2X network architecture, for example, a base station (eNB or gNB).

In addition, the embodiment provides a computer storage medium, which stores a data transmission program, the data transmission program being executed by at least one processor to implement the steps of the method in embodiment 2. Specific elaborations about the computer storage medium refer to the descriptions in the abovementioned technical solution and are omitted herein.

Figure 10:
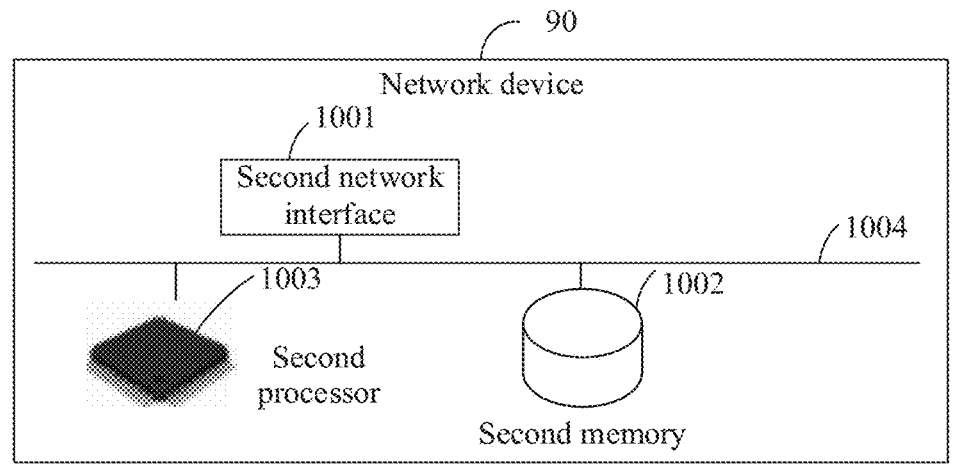
FIG. 10 is a specific hardware structure diagram of a network device according to an embodiment of the disclosure.

Based on the network device 90 and the computer storage medium, referring to FIG. 10, a specific hardware composition of the network device 90 provided in the embodiment of the disclosure is shown, which includes a second network interface 1001, a second memory 1002 and a second processor 1003. Each component is coupled together through a bus system 1004. It can be understood that the bus system 1004 is configured to implement connection communication between these components. The bus system 1004 includes a data bus and further includes a power bus, a control bus and a state signal bus. However, for clear description, various buses in FIG. 10 are marked as the bus system 1004. Herein, The second network interface 1001 is configured to receive and send a signal in a process of receiving and sending information with another external network element.

The second memory 1002 is configured to store a computer program which is executable in the second processor 1003.

The second processor 1003 is configured to execute the computer program to execute the following operations.

A reliable transmission request message sent by an access stratum of a terminal device is received.

Data to be transmitted is transmitted based on the reliable transmission request message through a set reliable transmission policy.

It can be understood that parts in the specific hardware structure of the network device 90 in the embodiment are similar to the corresponding parts in the abovementioned technical solutions and will not be elaborated herein.

The above is only the preferred embodiment of the disclosure and not intended to limit the scope of protection of the disclosure.

INDUSTRIAL APPLICABILITY

In the embodiments of the disclosure, the NAS of the terminal provides an instruction of performing reliable transmission for the access stratum according to the related description information of the data to be transmitted, and then the access stratum may request the network device for reliable transmission according to the instruction, so that the access stratum of the terminal may learn whether to perform reliable transmission on the data to be transmitted.

The invention claimed is:

1. A method of data transmission, comprising:
   acquiring, by a Non-Access Stratum (NAS) of a terminal device, description information of data to be transmitted;
   determining, by the NAS, reliable transmission indication information corresponding to the data to be transmitted according to a preset mapping relationship between data description information and reliable transmission indication information and the description information of the data to be transmitted, the reliable transmission indication information being used to indicate whether to perform reliable transmission on the data to be transmitted; and
   transmitting, by the NAS, the reliable transmission indication information corresponding to the data to be transmitted to an access stratum of the terminal device,
   sending, by the access stratum of the terminal device, to a network device a reliable transmission request message being used for transmission of the data to be transmitted through a set reliable transmission policy; and
   performing, by the terminal device, the transmission of the data to be transmitted.

2. The method of claim 1, wherein the description information, acquired by the NAS, of the data to be transmitted comprises:
   an identifier of a service or application to which the data to be transmitted belongs;
   or, a type of a service or application to which the data to be transmitted belongs;
   or, self-driving degree information corresponding to a service or application to which the data to be transmitted belongs;
   or, a data type of the data to be transmitted;
   or, a priority of the data to be transmitted.

3. The method of claim 2, wherein the preset mapping relationship between the data description information and the reliable transmission indication information comprises:
   a preset mapping relationship between: at least one identifier of service or application to which data belongs, and at least one reliable transmission indication information value;
   or, a preset mapping relationship between: types of services or applications to which the data belongs, and reliable transmission indication information;
   or, a preset mapping relationship between: self-driving degree information corresponding to services or applications to which the data belongs, and reliable transmission indication information;
   or, a preset mapping relationship between data types and reliable transmission indication information;
   or, a preset mapping relationship between data priorities and reliable transmission indication information.

4. The method of claim 3, wherein determining, by the NAS, the reliable transmission indication information corresponding to the data to be transmitted comprises:
   in case of the preset mapping relationship between the at least one identifier of service or application to which data belongs and the at least one reliable transmission indication information value, when the identifier of the service or application to which the data to be transmitted belongs is matched with the mapping relationship, determining that the reliable transmission indication information corresponding to the data to be transmitted indicates reliable transmission to be performed on the data to be transmitted;

or, in case of the preset mapping relationship between the types of the services or applications to which the data belongs and the reliable transmission indication information, when the type of the service or application to which the data to be transmitted belongs is matched with the mapping relationship, determining that the reliable transmission indication information corresponding to the data to be transmitted indicates reliable transmission to be performed on the data to be transmitted;

or, in case of the preset mapping relationship between the self-driving degree information corresponding to the services or applications to which the data belongs and the reliable transmission indication information, when the self-driving degree information corresponding to the service or application to which the data to be transmitted belongs is matched with the mapping relationship, determining that the reliable transmission indication information corresponding to the data to be transmitted indicates reliable transmission to be performed on the data to be transmitted;

or, in case of the preset mapping relationship between the data types and the reliable transmission indication information, when the data type of the data to be transmitted is matched with the mapping relationship, determining that the reliable transmission indication information corresponding to the data to be transmitted indicates reliable transmission to be performed on the data to be transmitted;

or, in case of the preset mapping relationship between the data priorities and the reliable transmission indication information, when the priority of the data to be transmitted is matched with the mapping relationship, determining that the reliable transmission indication information corresponding to the data to be transmitted indicates reliable transmission to be performed on the data to be transmitted.

5. The method of claim 1, further comprising:
setting, by the NAS of the terminal device, the mapping relationship between the data description information and the reliable transmission indication information based on pre-configuration or a content defined in an existing communication protocol.

6. The method of claim 1, further comprising:
sending the data to be transmitted based on a set Carrier Aggregation (CA) policy.

7. The method of claim 1, further comprising:
responsive to the reliable transmission indication information indicating reliable transmission not to be performed on the data to be transmitted, not transmitting, by the NAS, the data to be transmitted through the reliable transmission policy.

8. The method of claim 1, wherein the transmission is a Vehicle-to-Everything (V2X) transmission.

9. A method of configuration for data transmission, applied to a network device and comprising:
configuring for a terminal device, by the network device, a mapping relationship between data description information and reliable transmission indication information, the reliable transmission indication information being used to indicate whether to perform reliable transmission on the data to be transmitted;
wherein the mapping relationship is configured to instruct a Non-Access Stratum (NAS) of the terminal device to determine reliable transmission indication information corresponding to the data to be transmitted according to the mapping relationship and description information of data to be transmitted, and transmit the reliable transmission indication information corresponding to the data to be transmitted to an access stratum of the terminal device; wherein the description information of the data to be transmitted is acquired by the NAS of the terminal device;
receiving, by the network device, a reliable transmission request message being used for transmission of the data to be transmitted through a set reliable transmission policy from the access stratum of the terminal device; and
receiving, by the network device, the data transmitted by the terminal device.

10. The method of claim 9, wherein the mapping relationship between the data description information and the reliable transmission indication information comprises:
a preset mapping relationship between: at least one identifier of service or application to which data belongs, and at least one reliable transmission indication information value;
or, a preset mapping relationship between: types of services or applications to which the data belongs, and reliable transmission indication information;
or, a preset mapping relationship between: self-driving degree information corresponding to services or applications to which the data belongs, and reliable transmission indication information;
or, a preset mapping relationship between data types and reliable transmission indication information;
or, a preset mapping relationship between data priorities and reliable transmission indication information.

11. The method of claim 9, wherein the reliable transmission is a Vehicle-to-Everything (V2X) transmission.

12. A terminal device, comprising a processor in a Non-Access Stratum (NAS) and a network interface in an access stratum, wherein
the processor is configured to acquire description information of data to be transmitted;
the processor is further configured to determine reliable transmission indication information corresponding to the data to be transmitted according to a preset mapping relationship between data description information and reliable transmission indication information and the description information of the data to be transmitted, the reliable transmission indication information being used to indicate whether to perform reliable transmission on the data to be transmitted;
the processor is further configured to transmit the reliable transmission indication information corresponding to the data to be transmitted to the access stratum of the terminal device;
the network interface in the access stratum is configured to send a reliable transmission request message being used for transmission of the data to be transmitted through a set reliable transmission policy to a network device; and
the terminal is configured to perform the transmission of the data to be transmitted.

13. The terminal device of claim 12, wherein the description information of the data to be transmitted comprises:

an identifier of a service or application to which the data to be transmitted belongs;

or, a type of a service or application to which the data to be transmitted belongs;

or, self-driving degree information corresponding to a service or application to which the data to be transmitted belongs;

or, a data type of the data to be transmitted;

or, a priority of the data to be transmitted.

14. The terminal device of claim 13, wherein the preset mapping relationship between the data description information and the reliable transmission indication information comprises:

a preset mapping relationship between: at least one identifier of service or application to which data belongs, and at least one reliable transmission indication information value;

or, a preset mapping relationship between: types of services or applications to which the data belongs, and reliable transmission indication information;

or, a preset mapping relationship between: self-driving degree information corresponding to services or applications to which the data belongs, and reliable transmission indication information;

or, a preset mapping relationship between data types and reliable transmission indication information;

or, a preset mapping relationship between data priorities and reliable transmission indication information.

15. The terminal device of claim 13, wherein the processor is configured to:

in case of the preset mapping relationship between the at least one identifier of service or application to which data belongs and the at least one reliable transmission indication information value, when the identifier of the service or application to which the data to be transmitted belongs is matched with the mapping relationship, determine that the reliable transmission indication information corresponding to the data to be transmitted indicates reliable transmission to be performed on the data to be transmitted;

or, in case of the preset mapping relationship between the types of the services or applications to which the data belongs and the reliable transmission indication information, when the type of the service or application to which the data to be transmitted belongs is matched with the mapping relationship, determine that the reliable transmission indication information corresponding to the data to be transmitted indicates reliable transmission to be performed on the data to be transmitted;

or, in case of the preset mapping relationship between the self-driving degree information corresponding to the services or applications to which the data belongs and the reliable transmission indication information, when the self-driving degree information corresponding to the service or application to which the data to be transmitted belongs is matched with the mapping relationship, determine that the reliable transmission indication information corresponding to the data to be transmitted indicates reliable transmission to be performed on the data to be transmitted;

or, in case of the preset mapping relationship between the data types and the reliable transmission indication information, when the data type of the data to be transmitted is matched with the mapping relationship, determine that the reliable transmission indication information corresponding to the data to be transmitted indicates reliable transmission to be performed on the data to be transmitted;

or, in case of the preset mapping relationship between the data priorities and the reliable transmission indication information, when the priority of the data to be transmitted is matched with the mapping relationship, determine that the reliable transmission indication information corresponding to the data to be transmitted indicates reliable transmission to be performed on the data to be transmitted.

16. The terminal device of claim 12, wherein the processor in the NAS is further configured to set the mapping relationship between the data description information and the reliable transmission indication information based on pre-configuration or a content defined in an existing communication protocol.

17. The terminal device of claim 12, wherein the network interface is further configured to send the data to be transmitted to the network device based on a set Carrier Aggregation (CA) policy.

18. The terminal device of claim 12, wherein the processor is further configured to, responsive to the reliable transmission indication information indicating reliable transmission not to be performed on the data to be transmitted, not transmit the data to be transmitted through the reliable transmission policy.

19. The terminal device of claim 12, wherein the transmission is a Vehicle-to-Everything (V2X) transmission.

20. A network device, comprising:

a processor for configuring for a terminal device, by the network device, a mapping relationship between data description information and reliable transmission indication information, the reliable transmission indication information being used to indicate whether to perform reliable transmission on the data to be transmitted;

wherein the mapping relationship is configured to instruct a Non-Access Stratum (NAS) of the terminal device to determine reliable transmission indication information corresponding to the data to be transmitted according to the mapping relationship and description information of data to be transmitted, and transmit the reliable transmission indication information corresponding to the data to be transmitted to an access stratum of the terminal device; wherein the description information of the data to be transmitted is acquired by the NAS of the terminal device;

the processor is further configured to:

receive a reliable transmission request message being used for transmission of the data to be transmitted through a set reliable transmission policy from the access stratum of the terminal device; and receive the data transmitted by the terminal device.

21. The network device of claim 20, wherein the mapping relationship between the data description information and the reliable transmission indication information comprises:

a preset mapping relationship between: at least one identifier of service or application to which data belongs, and at least one reliable transmission indication information value;

or, a preset mapping relationship between: types of services or applications to which the data belongs, and reliable transmission indication information;

or, a preset mapping relationship between: self-driving degree information corresponding to services or applications to which the data belongs, and reliable transmission indication information;

or, a preset mapping relationship between data types and reliable transmission indication information;

or, a preset mapping relationship between data priorities and reliable transmission indication information.

22. The network device of claim 20, wherein the reliable transmission is a Vehicle-to-Everything (V2X) transmission.

* * * * *